United States Patent
Richard et al.

(10) Patent No.: US 8,408,363 B2
(45) Date of Patent: Apr. 2, 2013

(54) PTO LUBE CONTROL SYSTEM

(75) Inventors: Remy Richard, Montaigu (FR); Chad Gregory Vandenberg, Dike, IA (US); Jeffrey Alan Buttjer, Cedar Falls, IA (US); Hubert Defrancq, Guignicourt (FR)

(73) Assignee: Deere & Company, Moline, IL (US)

( * ) Notice: Subject to any disclaimer, the term of this patent is extended or adjusted under 35 U.S.C. 154(b) by 595 days.

(21) Appl. No.: 12/689,634

(22) Filed: Jan. 19, 2010

(65) Prior Publication Data
US 2011/0174578 A1    Jul. 21, 2011

(51) Int. Cl.
*F16N 25/04*    (2006.01)
(52) U.S. Cl. ......................................... 184/35
(58) Field of Classification Search ............... 184/35; 137/575, 558, 559; 192/12 C
See application file for complete search history.

(56) References Cited

U.S. PATENT DOCUMENTS

| | | | | |
|---|---|---|---|---|
| 3,669,229 | A | * | 6/1972 | Ronayne et al. ............ 192/12 C |
| 3,724,598 | A | * | 4/1973 | Smith ............................ 184/6.1 |
| 4,029,189 | A | * | 6/1977 | Freiburger ................ 192/113.35 |
| 4,179,887 | A | * | 12/1979 | Ridder et al. .................... 60/420 |
| 4,336,827 | A | * | 6/1982 | Golan ........................ 137/624.27 |
| 4,425,817 | A | * | 1/1984 | Wells et al. ...................... 74/467 |
| 4,540,078 | A | * | 9/1985 | Wetrich ...................... 192/85.61 |
| 4,567,971 | A | * | 2/1986 | Hille et al. ................... 192/12 C |
| 4,640,401 | A | * | 2/1987 | Koltookian ................ 192/85.61 |
| 5,105,929 | A | * | 4/1992 | Schmid et al. .............. 192/12 C |
| 5,228,355 | A | * | 7/1993 | Smith et al. ...................... 74/467 |
| 6,095,297 | A | * | 8/2000 | Bosl et al. .................... 192/12 C |
| 2005/0172740 | A1 | | 8/2005 | Ebihara et al. |
| 2008/0296115 | A1 | * | 12/2008 | Biles et al. ................. 192/66.32 |

FOREIGN PATENT DOCUMENTS
EP    0952367    10/1999
GB    1562518    3/1980

OTHER PUBLICATIONS
European Search Report, Feb. 9, 2012, 7 pages.

* cited by examiner

*Primary Examiner* — Michael Mansen
*Assistant Examiner* — Michael Riegelman

(57) ABSTRACT

The PTO assembly includes an engine driven input shaft, an output shaft, a transmission, a disconnect unit for selectively coupling and uncoupling the input shaft from the transmission and a clutch for coupling an uncoupling the transmission from the output shaft. A lubrication system includes a shaft lube circuit for lubricating the input shaft, a pump, and a lube control valve for controlling communication of lubricant from the pump to the lube circuit. The lube control valve is operatively coupled to the disconnect unit so that when the disconnect unit is engaged the lube control valve blocks communication from the pump to the lube circuit, and when the disconnect unit is disengaged the lube control valve communicates the pump to the lube circuit. The lubrication system also includes a transmission lube circuit for lubrication the transmission. The control valve communicates lubricant to the transmission lube circuit when the disconnect unit is engaged and disengaged.

10 Claims, 2 Drawing Sheets

PTO LUBE CONTROL SYSTEM

FIELD OF THE INVENTION

The present invention relates to a power take off (PTO) assembly with a lube control system.

BACKGROUND OF THE INVENTION

A PTO assembly, such as a front PTO assembly, which has been typically used on an agricultural tractor, normally includes a constantly rotating input shaft which is driven by the tractor engine. The input or top shaft is connected by a transmission and a clutch to an output shaft. The input shaft drives a pump which supplies lubricant to the rotating components of the PTO assembly. The input shaft may be disconnected from the rest of the gear train, allowing the rest of the gear train to be static so the gears will not consume or waste any power. It would be desirable to have a PTO system wherein lubricating oil is directed to the input shaft when the input shaft is disconnected from the rest of the gear train.

The second task being performed is the shifting of the shuttle valve by the disconnect shaft to a position that reroutes the oil to the top shaft generating 4 bar pressure instead 18 bar for the system pressure.

SUMMARY OF THE INVENTION

Accordingly, an object of this invention is to provide a PTO lube system wherein lubricating oil is directed to the input shaft when the input shaft is disconnected from the rest of the gear train.

A further object of the invention is to provide such a PTO lube control system which minimizes the work required of the pump.

These and other objects are achieved by the present invention, wherein a lubrication system is provided for a power take off (PTO) assembly. The PTO assembly includes an engine driven input shaft, an output shaft, a transmission for transmitting torque from the input shaft to the output shaft, a disconnect unit for selectively coupling and uncoupling the input shaft from the transmission and a clutch for coupling an uncoupling the transmission to the output shaft. The lubrication system includes a component lube circuit for lubricating the input shaft, a pump for supplying lubricant from a reservoir, and a lube control valve for controlling communication of lubricant from the pump to the component lube circuit. The lube control valve is operatively coupled to the disconnect unit so that when the disconnect unit is engaged the lube control valve blocks communication from the pump to the lube circuit, and when the disconnect unit is disengaged the lube control valve communicates the pump to the lube circuit. The lubrication system also includes a transmission lube circuit for lubricating the transmission. The control valve communicates lubricant to the transmission lube circuit when the disconnect unit is engaged and disengaged.

DESCRIPTION OF THE PREFERRED EMBODIMENT

Figure 1:
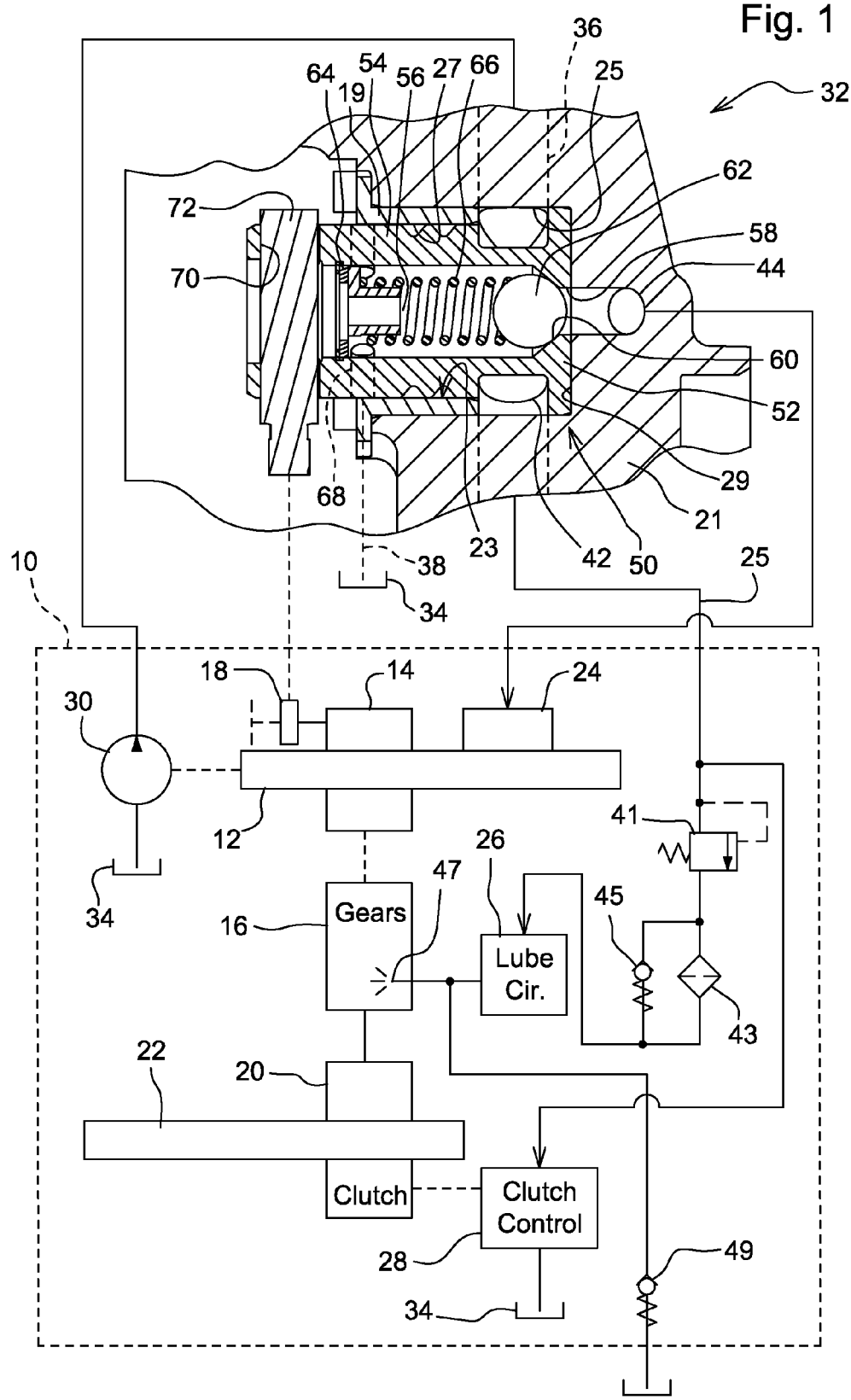
FIG. 1 is a simplified schematic diagram of the present invention in the PTO engaged state.
Figure 2:
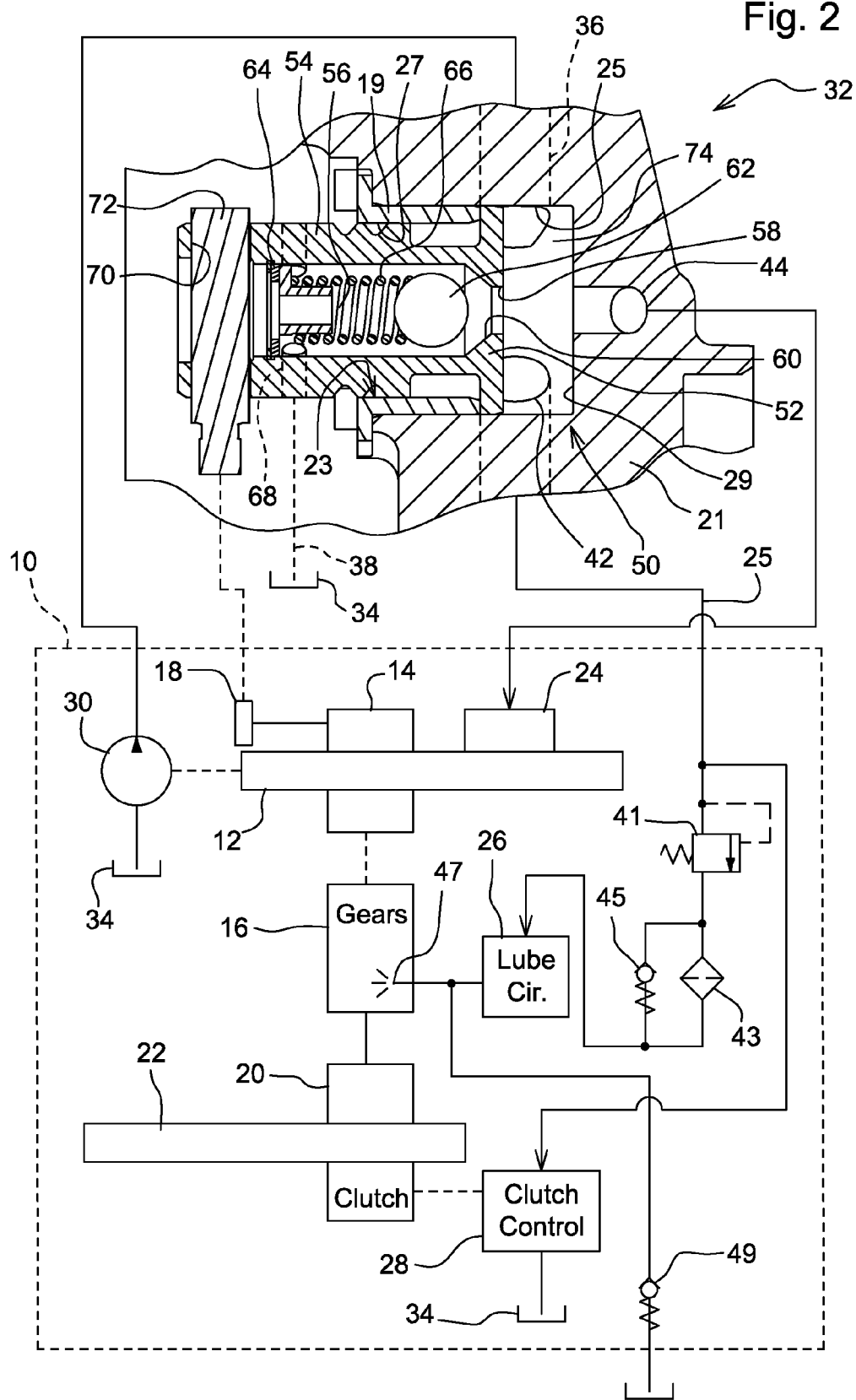
FIG. 2 is a simplified schematic diagram of the present invention in the PTO disengaged state.

Referring to FIGS. 1 and 2, a PTO 10 includes an input shaft 12 which is continuously driven by a power source, such as a vehicle engine (not shown). The input shaft 12 is coupled to a disconnect unit 14. Disconnect unit 14 is coupled to a gear or transmission unit 16. Disconnect unit 14 includes an input member 18 which is shiftable to place the disconnect unit 14 in an engaged state (shown by the solid line), and to place the disconnect unit 14 in a disengaged state (shown by the dashed line). In its disengaged state, the disconnect unit 14 prevents torque from being transmitted from the input shaft 12 to the transmission 16. The transmission 16 is coupled to an output shaft 22 through a hydraulically operated clutch 20.

The input shaft 12 is lubricated by an input shaft lube circuit 24. Other components of the PTO 10 are lubricated by PTO lube circuit 26. Clutch 20 is controlled by a conventional clutch control unit 28.

The input shaft 12 drives a hydraulic pump 30. A lube control valve 32 controls communication of hydraulic fluid for control and lubrication purposes between the pump 30 lube, reservoir 34, lube circuits 24 and 26, and clutch control valve 28. Valve 32 includes a housing 21 which has a valve bore 23 with a large diameter portion 25 and a smaller diameter portion 27 formed by sleeve 19 and an end wall 29. The housing 21 forms a pump port 36 which connects the valve bore 23 to the outlet of pump 30, a second port 42 which connects the valve bore 23 to line 25, and a first port 44. First port 44 extends through end wall 29 and connects the valve bore 23 to input shaft lube circuit 24.

Line 25 connects port 42 connected to clutch control unit 28 and to an inlet of pressure regulating valve 41. The outlet of pressure regulating valve 41 is connected to parallel connected oil cooler 43 and cooler bypass valve 45. The outlets of oil cooler 43 and cooler bypass valve 45 are connected to an inlet of clutch lube circuit 26. An outlet of clutch lube circuit 26 is connected to a forced idler lube orifice 47 and to sump via a lube relief valve 49. Pressure regulating valve 41 prevents clutch lube circuit 26 from receiving lube fluid unless the pressure is at least a minimum or system pressure, such as 18 bar.

A hollow cylindrical valve member or spool 50 is slidable in the valve bore 23. Spool 50 has a larger diameter head 52 which slides in larger diameter bore portion 25 and a smaller diameter sleeve 54 which slides in smaller diameter bore portion 27 formed by sleeve 19. Sleeve 54 surrounds a chamber 56. An axial bore 58 extends though a central portion of the head 52 and communicates chamber 56 to port 44. Spool 50 forms a fustroconical surface or valve seat 60. A valve ball 62 is received within chamber 56. An annular spring stop 64 is mounted in the spool 50 in chamber 56 spaced apart from seat 60. A spring 66 engages the stop 64 and the ball 62 and urges the ball 62 towards the seat 60. A plurality of radial passages 68 communicate chamber 56 with the exterior of the sleeve 54. A passage 38 connects the bores 68 to sump 34. An arm bore 70 extends radially though the end of sleeve 54. Arm bore 70 receives a link arm 72 which is mechanically connected to the input member 18 of the disconnect unit 14.

When the disconnect unit 14 is engaged, the lube control valve 32 will be in the position shown in FIG. 1 with the spool 50 engaging the end wall 29. In this position lubrication fluid will flow from pump 30 though port 36, around sleeve 54 to port 42 and to clutch control unit 28 and to lube circuit 26 via pressure regulating valve 41. The spool 50 blocks communication between the pump 30 and port 44, and no lube fluid will flow into chamber 56 or through port 58 or to port 44. Thus, when the PTO 10 is connected by disconnect unit 14, the lube will flow to the PTO lube circuit 26 only when the lube pressure exceeds the system pressure, such as 18 bar, set by the pressure regulating valve 41.

Referring now to FIG. 2, when the disconnect unit 14 is disengaged, the input member 18 will shift arm 70 and spool 50 to the left into the position shown. In this position head 52 will be spaced apart from end wall 29 and communication will be open from pump port 36 to port 42 and from pump port 36 to port 44. Thus, lube fluid will flow to input shaft lube circuit 24, in addition to lube circuit 26 (if valve 41 is open) and to clutch control valve 28. If the pressure in the chamber 74 between head 52 and end wall 29 reaches a certain pressure, such as 4 bar, this fluid pressure will move ball 62 away from seat 60 and open communication between chamber 74 and sump 34 via chamber 56, passage 68 and passage 38. The pressure differential between the larger diameter head 52 and the smaller diameter sleeve 54 helps to keep spool in the open position shown in FIG. 2. As a result, lube fluid flows to lube circuit 24 at the lower 4 bar pressure, while the pressure regulating valve 41 remains closed. Thus, lube flow is provided to the lube circuit 24, but less work is required of the pump 30 because it only has to supply fluid at a lower pressure of 4 bar.

While the present invention has been described in conjunction with a specific embodiment, it is understood that many alternatives, modifications and variations will be apparent to those skilled in the art in light of the foregoing description. Accordingly, this invention is intended to embrace all such alternatives, modifications and variations which fall within the spirit and scope of the appended claims.

We claim:

1. A lubrication system for a power take off (PTO) assembly, the PTO assembly having an input shaft driven by a power source, an output shaft, a transmission for transmitting torque from the input shaft to the output shaft, and a disconnect unit for selectively coupling and uncoupling the input shaft from the transmission, the lubrication system comprising:
    a component lube circuit for lubricating a component of the PTO assembly;
    a pump for supplying lubricant from a reservoir; and
    a lube control valve for controlling communication of lubricant from the pump to the component lube circuit, the lube control valve being operatively coupled to the disconnect unit so that when the disconnect unit is engaged the lube control valve blocks communication from the pump to the component lube circuit, and when the disconnect unit is disengaged the lube control valve communicates the pump to the component lube circuit;
    a transmission lube circuit for lubricating the transmission; and the control valve communicating lubricant to the transmission lube circuit when the disconnect unit is engaged and disengaged; the control valve comprising a housing having a valve bore therein, a pump port communicating the valve bore with the pump, a first port communicating the valve bore with the component lube circuit, the first port extending though an end wall of the valve bore, and a second port communicating the valve bore with the transmission lube circuit; and a valve spool slidable in the valve bore and coupled to the disconnect unit, the spool being movable from a first position wherein communication is open between the pump port and the second port and communication is closed between the pump port and the first port, to a second position wherein communication is open between the pump port and the second port and communication is open between the pump port and the first port, the valve spool having a hollow body and a head wall at one end thereof, the head wall having a passage extending therethrough, one end of the passage being in communication with the first port, an other end of the passage being surrounded by a valve seat, the valve spool having a sump passage extending therethrough and communicating an interior of the valve spool with a fluid reservoir; a valve ball received by the valve spool and engagable with the valve seat; and a spring received by the valve spool and biased to urge the valve ball towards with the valve seat, the valve ball being movable away from the valve seat to thereby limit pressure in the first port.

2. The lubrication system of claim 1, wherein the control valve comprises:
    a housing having a valve bore therein, a pump port communicating the valve bore with the pump, a first port communicating the valve bore with the component lube circuit, and a second port communicating the valve bore with the transmission lube circuit; and
    a valve spool slidable in the valve bore and coupled to the disconnect unit, the spool being movable from a first position wherein communication is open between the pump port and the second port and communication is closed between the pump port and the first port, to a second position wherein communication is open between the pump port and the second port and communication is open between the pump port and the first port.

3. The lubrication system of claim 2, wherein the control valve further comprises:
    a pressure limiting valve which is operable to limit pressure in the first port.

4. The lubrication system of claim 1, wherein the control valve comprises:
    a housing having a valve bore therein, a pump port communicating the valve bore with the pump, a first port communicating the valve bore with the component lube circuit; and
    a valve spool slidable in the valve bore and coupled to the disconnect unit, the spool being movable from a first position closing communication between the pump port and the first port to a second position opening communication between the pump port and the first port.

5. The lubrication system of claim 1, further comprising:
    a fluid line between the control valve and a clutch control unit for controlling a clutch of the PTO assembly, the control valve communicating the pump port to the fluid line in both a first position and a second position of the control valve.

6. The lubrication system of claim 1, further comprising:
    a pressure regulating valve between the control valve and the transmission lube circuit, the pressure regulating valve closing communication between the control valve and the transmission lube circuit unless pump pressure exceeds a limit pressure.

7. The lubrication system of claim 1, wherein:
    the component of the PTO assembly comprises an input shaft driven by an engine.

8. A lubrication system for a power take off (PTO) assembly, the PTO assembly having an input shaft driven by a power source, an output shaft, a transmission for transmitting torque from the input shaft to the output shaft, and a disconnect unit for selectively coupling and uncoupling the input shaft from the transmission, the lubrication system comprising:
    a shaft lube circuit for lubricating the input shaft;
    a transmission lube circuit;
    a pump for supplying lubricant from a reservoir; and
    a lube control valve for controlling communication of lubricant from the pump to the lube circuits, the lube control valve being operatively coupled to the disconnect unit so that when the disconnect unit is engaged the lube control valve blocks communication from the pump to the shaft lube circuit and communicates the pump with the transmission lube circuit, and when the disconnect unit is disengaged the lube control valve communicates the pump to both lube circuits; wherein the control valve comprises: a housing having a valve bore therein, a pump port communicating the valve bore with the pump, a first port communicating the valve bore with the lube circuit, and second port communicating the valve bore with the PTO lube circuit; and a valve spool slidable in the valve bore and coupled to the disconnect unit, the spool being movable from a first position closing communication between the pump port and the first port to a second position opening communication between the pump port and the first port; wherein the valve bore has a cylindrical side wall joined to an axially facing end wall, the pump and second ports extending through the side wall, and the first port extending through said end wall; and the valve spool comprises: a hollow sleeve connected at one end to a head wall, the sleeve having an outer annular groove adjacent the head wall, the head wall having a passage extending axially therethrough, the head wall forming a valve seat surrounding the passage, the groove communicating the pump port with the second port when the spool is in its first position, the sleeve having a passage extending therethrough and communicating an interior of the sleeve with a reservoir, and the head wall engaging the end wall to close communication between the pump port and the first port when the spool is in its first position; a valve ball received within the sleeve; and a spring biased to urge the valve ball into engagement with the seat to close communication through the passage.

9. The lubrication system of claim 8, wherein the valve spool comprises:
a bore extending radially though an end portion; and
the bore receiving an arm which is coupled to the disconnect unit.

10. The lubrication system of claim 8, further comprising:
a fluid line between the control valve and a clutch control unit for controlling a clutch of the PTO assembly, the control valve communicating the pump port to the fluid line in both a first position and a second position of the control valve.

* * * * *